(12) United States Patent
Wada et al.

(10) Patent No.: US 6,669,398 B2
(45) Date of Patent: Dec. 30, 2003

(54) LOCKING STRUCTURE FOR CONNECTOR

(75) Inventors: Yoshimi Wada, Shizuoka (JP); Kazuto Ohtaka, Shizuoka (JP); Shigeru Tanaka, Shizuoka (JP); Naoto Sugie, Shizuoka (JP); Toshinori Yamamoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 33 days.

(21) Appl. No.: 09/797,809

(22) Filed: Mar. 5, 2001

(65) Prior Publication Data

US 2001/0035652 A1 Nov. 1, 2001

(30) Foreign Application Priority Data

Mar. 3, 2000 (JP) ..................................... P. 2000-059288

(51) Int. Cl.⁷ .................................................. F16D 1/00
(52) U.S. Cl. ..................... 403/329; 403/322.4; 403/330
(58) Field of Search .............................. 403/321, 322.1, 403/322.4, 325, 326, 327, 329, 330

(56) References Cited

U.S. PATENT DOCUMENTS

| | | | | |
|---|---|---|---|---|
| 3,602,009 A | * | 8/1971 | Powell | 285/319 |
| 3,628,812 A | * | 12/1971 | Larralde et al. | 285/24 |
| 3,713,076 A | * | 1/1973 | Gabrielian et al. | 285/317 |
| 4,272,145 A | | 6/1981 | LaDuke | |
| 4,365,696 A | * | 12/1982 | Telford | 192/112 |
| 4,750,238 A | * | 6/1988 | Rock et al. | 16/241 |
| 4,801,275 A | | 1/1989 | Ikeda et al. | |
| 4,986,766 A | | 1/1991 | Leonard et al. | |
| 5,104,253 A | * | 4/1992 | Zielinski et al. | 403/329 |
| 5,624,272 A | * | 4/1997 | Ohsumi | 439/353 |
| 6,059,598 A | * | 5/2000 | Yamashita et al. | 403/326 |
| 6,146,183 A | | 11/2000 | Jinno et al. | |

FOREIGN PATENT DOCUMENTS

| | | | | |
|---|---|---|---|---|
| JP | 61-60482 | * | 4/1986 | ......... H01R/13/639 |
| JP | 2-54180 | | 4/1990 | |
| JP | 3-39272 | * | 4/1991 | ......... H01R/13/639 |

* cited by examiner

Primary Examiner—Lynne H. Browne
Assistant Examiner—Jori Schiffman
(74) Attorney, Agent, or Firm—Sughrue Mion, PLLC

(57) ABSTRACT

A lock portion for a connector which is adapted to disengageably lock connector housings which are adapted to be engaged with each other by locking an engaging portion provided on the male housing with a latch portion provided on the female housing, characterized in that flexible lock arms which are fixed on a horizontal wall of the female housing so as to extend in an engaging direction includes the latch portion at an opposite side, and a disengaging lever portion which is connected at its one end to the latch portion so as to extend along the lock arms, and which rotates with the latch portion around a support portion which is abutted movably against the horizontal wall by pushing a finger touch portion for lock disengaging operation in a backward end, whereby a locked condition will be disengaged.

7 Claims, 10 Drawing Sheets

ENGAGEMENT DISENGAGEMENT

LOCKING STRUCTURE FOR CONNECTOR

BACKGROUND OF THE INVENTION

1. Field of the Invention

The present invention relates to a locking structure for a connector.

The present application is based on Japanese Patent Application No. 2000-59288, which is incorporated herein by reference.

2. Description of the Related Art

A conventional locking structure for a connector as shown in FIG. 15, for example, is disclosed in Japanese Publication No. JP-U-61-60482 of unexamined Utility Model Application. FIG. 15A is a sectional view of an essential part. FIG. 15B is a view as seen in a direction of an arrow A of FIG. 15A, and FIG. 15C is a view as seen in a direction of an arrow B of FIG. 15A.

A female connector housing 201 is provided with a lock arm 203 having elasticity, and the lock arm 203 has a hook portion 205 at its distal end. When a male connector housing 207 is inserted into the female connector housing 201, an engaging portion 209 of the male connector housing 207 pushes the hook portion 205 of the lock arm 203 upward, and a support portion 211 of the lock arm 203 is flexed to bring the lock arm 203 into a posture as shown by a dotted line in FIG. 15A. After the engaging portion 209 has passed over the hook portion 205 of the lock arm 203, the lock arm 203 is restored from the deformed posture allowing both the connector housings 201 and 207 to be locked.

In order to disengage the connector housings from the locked condition, a backward end portion 213 of the lock arm 203 is pushed down to bring the hook portion 205 of the lock arm 203 into a pushed up state in the same manner as done when the male connector housing 207 has been inserted, thereby disengaging the lock of the hook portion 205. In order to avoid, on this occasion, an excessive push up of the lock arm 203 (too much flexure of the support portion 211), the lock arm 203 is designed in such a manner that when the lock arm 203 is inclined by an angle θ as shown in FIG. 15A, projections 215 formed on both side ends of the lock arm 203 in a lateral direction come in contact with stoppers 217, thereby to restrict an amount of flexure of the support portion 211.

However, the lock arm 203 is so constructed that an area from the hook portion 205 of the lock arm 203 to the backward end portion 213 has high rigidity lacking in flexibility, and flexible areas are concentrated on the support portion 211 only. In order to set a retaining force of the lock arm in a locked condition to be large, a thickness of the support portion 211 may be increased. However, operating force for disengaging the lock will be increased accordingly, which results in an increase of a stress on the support portion 211, and the support portion 211 will be likely to be broken. Alternatively, material having less rigidity may be employed without changing a shape, but tendency of the breakage will not be improved.

In view of the above, an object of the present invention is to provide a lock structure in which flexure of a locking member can be dispersed, and in addition, which has sufficient strength and is difficult to be broken.

SUMMARY OF THE INVENTION

In order to solve the above-described problem, the present invention is a locking structure for a connector which is adapted to disengageably lock a male connector housing and a female connector housing which are adapted to be engaged with each other by locking an engaging portion provided on one of the housings with a latch portion provided on the other of the housings, characterized in that the other connector housing includes the latch portion at an opposite side of flexible arms which are fixed at their one ends on a wall of the housing so as to extend in an engaging direction of the housings, and a disengaging lever portion which is connected at its one end to the latch portion so as to extend along the arms, and the disengaging lever portion rotates with the latch portion around a pivot which is movable when the lock is disengaged.

Therefore, a member resisting to displacement of the latch portion when both the housings are engaged is only the arms in a cantilever type, and by appropriately setting a length and a thickness of the arms for example, the arms are uniformly flexed along their full length. Since a stress will not be concentrated on base end portions of the arms, a flexural angle at the fixed ends of the arms is thus limited to be small, enabling the arms to be less breakable.

When the lock is disengaged, the latch portion rotates around the pivot together with the disengaging lever portion, whereby the locked condition will be disengaged. On this occasion, because the pivot of the rotation can be displaced, the latch portion can rotate without resistance, and the arms which have been in the flexed state will not be subjected to an undue load. Therefore, the problem of shortage of strength will not happen.

According to the second aspect of the present invention, there provided a locking structure for the connector as described above and characterized in that at least one of the disengaging lever portion and the wall of the housing has a support portion which serves as the pivot of the rotation of the latch portion.

Accordingly, similar actions and effects to those of the above-described invention of can be obtained, and at the same time, flexibility of designing the support portion will be increased.

According to the third aspect of the present invention, there is provided a locking structure for the connector as described above and characterized in that the pivot of the rotation is provided at either one of a substantially same position as the fixed ends of the flexible arms in the engaging direction, and a position on a lock disengaging operation section.

Accordingly, similar actions and effects to those of the above-described inventions can be obtained, and at the same time, because the length of the arms is substantially equal to a radius of the rotation of the latch portion, strength of the fixed ends of the arms can be easily set.

According to the fourth aspect of the present invention, there is provided a locking structure for the connector as described above and characterized in that the disengaging lever portion includes the lock disengaging operation section at an opposite side to the latch portion interposing the support portion, and a distance between the support portion and the latch portion is set to be larger than a distance between the support portion and the lock disengaging operation section.

Accordingly, similar actions and effects to those of the above-described inventions can be obtained, and at the same time, operating force and operating stroke of the disengaging operation section required for disengagement of the lock can be appropriately and easily set.

According to the fifth aspect of the present invention, there is provided a locking structure for the connector as described above and characterized in that the disengaging lever portion is connected to the connector housing by means of a hinge at an opposite side to the latch portion interposing the pivot.

Accordingly, when the connector housing is molded, dimensional stability with respect to a position of the disengaging lever portion and a position of the support portion will be enhanced.

According to the sixth aspect of the present invention, there is provided a locking structure for the connector as described above and characterized in that the locking structure further includes lever side excessive displacement preventing pieces provided on both sides of a finger touch portion which is positioned at an opposite side to the latch portion, and housing side excessive displacement preventing pieces provided on the female connector housing and against which the lever side excessive displacement preventing pieces are adapted to be abutted thereby to prevent an excessive displacement of the disengaging lever portion in a locking direction.

Accordingly, when an external force in the locking direction is inadvertently applied to the disengaging lever portion, the lever side excessive displacement preventing pieces are abutted against the housing side excessive displacement preventing pieces, whereby the excessive displacement of the disengaging lever portion in the locking direction will be prevented.

According to the seventh aspect of the invention, there is provided a locking structure for a connector described as the sixth aspect of the present invention and characterized in that the female connector housing includes an outer wall which covers upper parts of the arms up to the latch portion, an inner face of the outer wall having an excessive displacement preventing wall portion against which the latch portion is adapted to be abutted thereby to prevent an excessive displacement of the disengaging lever portion in a lock disengaging direction.

Accordingly, similar actions and effects to those of the invention described as the sixth aspect of the present invention can be obtained, and in addition, when an external force in the lock disengaging direction is inadvertently applied to the disengaging lever portion, the latch portion is abutted against the excessive displacement preventing wall portion, whereby the excessive displacement of the disengaging lever portion in the lock disengaging direction will be prevented.

DETAIL DESCRIPTION OF THE PREFERRED EMBODIMENTS

A mode for carrying out the invention will be described hereunder.

First Embodiment

Figure 1:
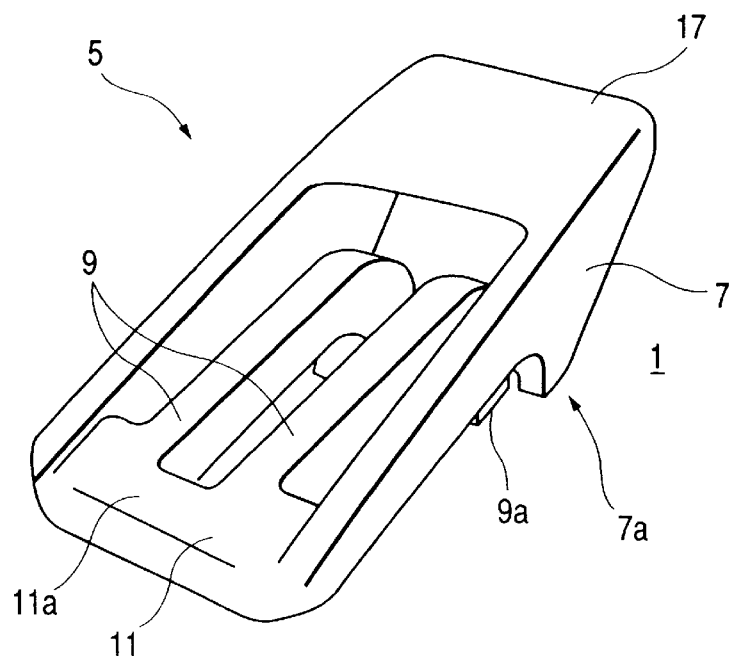
FIG. 1 is a perspective view of a whole lock portion according to the first embodiment of the invention.
Figure 2:
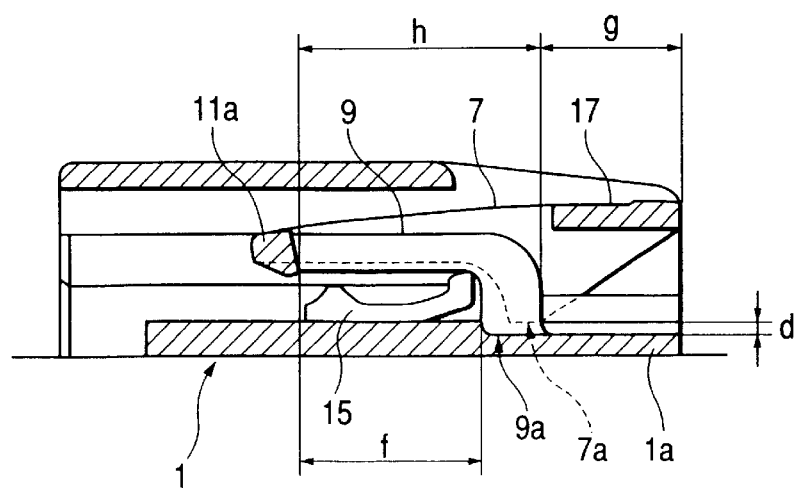
FIG. 2 is a sectional view of a lock portion of a female connector housing according to the first embodiment.
Figure 3:
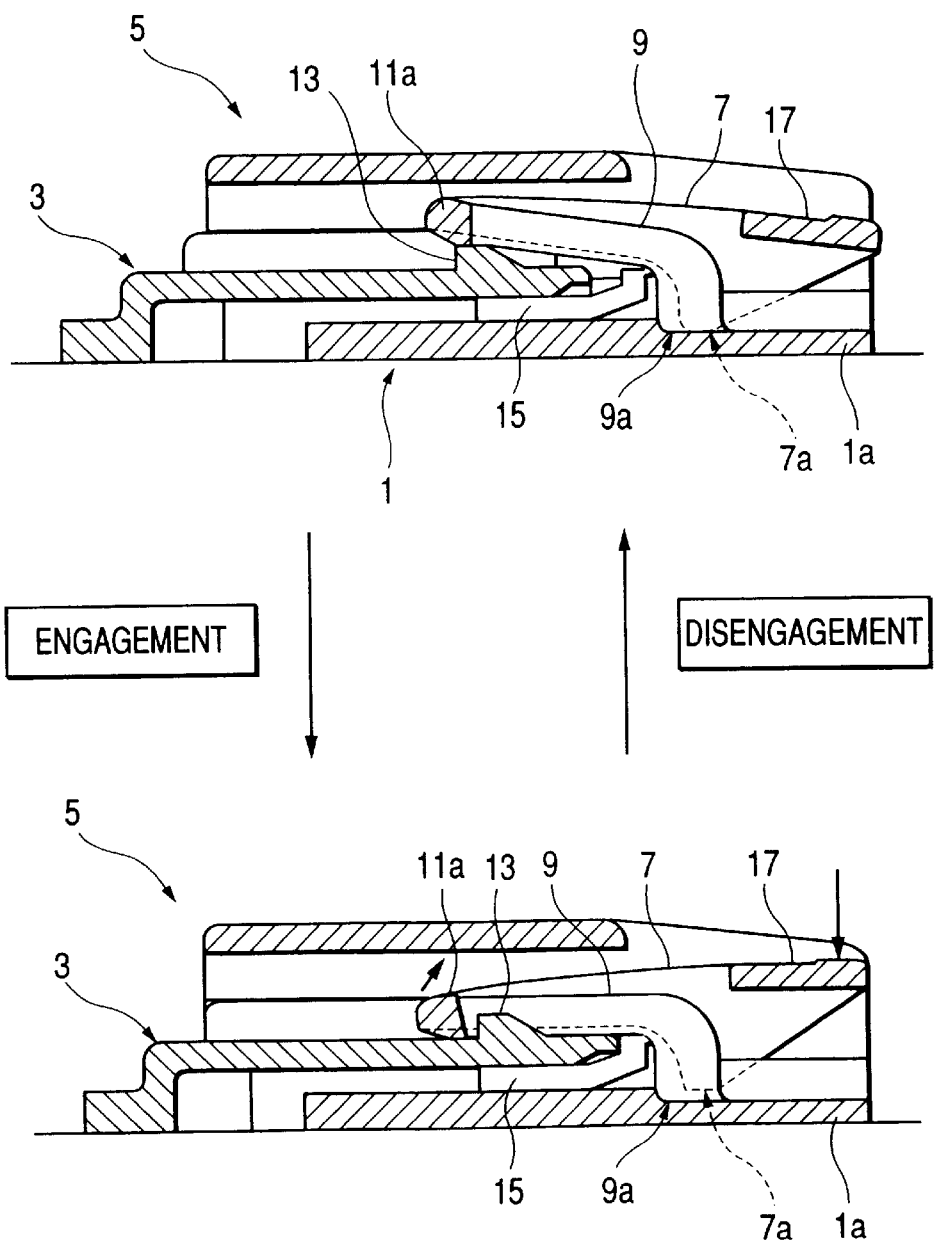
FIG. 3 shows both connector housings according to the first embodiment in operative states, wherein the upper part of FIG. 3 is a sectional view showing a state where a latch portion is not engaged with an engaging portion, and the lower part of FIG. 3 is a sectional view showing a state where the latch portion is engaged with the engaging portion.

A first embodiment of the invention will be described referring to FIGS. 1 to 4. FIG. 1 is a perspective view of a whole lock portion in a female connector housing. FIG. 2 is a sectional view of a part of the female connector housing taken along an engaging direction of both the male and female connector housings (hereinafter referred to simply as housings). FIG. 3 is an explanatory view showing lock arms (arms) in operative state when the two housings are engaged and disengaged. FIG. 4 is an explanatory view showing modified examples in design of the locking structure.

As shown in FIG. 1, a lock portion 5 in a female housing 1 is provided in a form of an half-divided arrow head by extending its both side walls into the engaging direction (a longitudinal direction in FIG. 1), and the side walls constitute a disengaging lever portion 7. At a forward end portion of the disengaging lever portion 7 (an end toward the front in FIG. 1), there is formed a front edge portion 11 laterally extending in a full width. Two plate-like lock arms 9 extend backward from the front edge portion 11 substantially horizontally. As shown in FIG. 2, backward end portions (a farmost end in FIG. 1) of the two lock arms 9 are bent downward to form fixed ends 9a which continue to a horizontal wall portion 1a of the female housing 1.

The front edge portion 11 located between the two lock arms 9 which are laterally spaced constitutes a latch portion 11a which is adapted to be engaged with an engaging portion 13 of a male housing 3 (See FIG. 3). An overhanging length of the latch portion 11a from the fixed ends 9a of the lock arms is represented by f (See FIG. 2). Reference numeral 15 in FIG. 2 represents a seal member.

Meanwhile, a lower end portion of the disengaging lever portion 7 is at a substantially same position in the engaging direction as the fixed ends 9a in the backward part of the lock arms 9, and constitutes a support portion 7a which serves as a pivot of rotation of the disengaging lever portion 7 on occasion of lock disengaging operation which will be described later. This support portion 7a has a gap d (See FIG. 2) with respect to the horizontal wall 1a of the female housing 1, in a state where the female housing 1 is alone.

A flat face area extending backward in a full width from the support portion 7a of the disengaging lever portion 7 constitutes a finger touch portion 17 (lock disengaging operation section) for the lock disengaging operation. A distance from the support portion 7a to the finger touch portion 17 is represented by g, and a distance from the support portion 7a to the latch portion 11a is represented by h.

Now, actions of the lock portion 5 when both the housings 1 and 3 are engaged and disengaged (lock disengaging time) will be described referring to FIG. 3.

The upper part of FIG. 3 shows a state just before the male housing 3 is engaged and locked with the female housing 1. When the engagement between both the housings 1 and 3 proceeds and the engaging portion 13 of the male housing 3 comes in contact with the latch portion 11a of the lock arms 9, the engaging portion 13 pushes the latch portion 11a upward. At this instant, the lock arms 9 are subjected to an upward bending moment around the backward fixed ends 9a. Accordingly, the lock arms 9 are flexed uniformly along their total length f, and the flexure will not be concentrated on the fixed ends 9a. A working radius of the pushing up force is f.

Because the radius f is set to be large, a flexural angle of the lock arms 9 near the fixed ends 9a (hereinafter referred to simply as "the fixed ends 9a") becomes small, thus eliminating a risk of breakage.

Following this flexural deformation of the lock arms 9, the support portion 7a of the disengaging lever portion 7 continued from the front edge portion 11 (the latch portion 11a) is displaced downward and is brought into contact with the horizontal wall 1a of the housing. In short, the gap d becomes zero. After the engaging portion 13 has passed over the latch portion 11a, the lock arms 9 which have been in a flexed posture since the latch portion 11a has been pushed up will return to the original posture, allowing the male housing 3 to be locked. The gap d of the support portion 7a will be recovered in the locked state. Although the posture of the disengaging lever portion 7 will change during transition to the locked state, this change of the posture will be performed freely without interference from other members.

Then, the lower part of FIG. 3 shows a state in which the lock between the housings 1 and 3 is being disengaged. In order to disengage the lock, the finger touch portion 17 in the back end of the disengaging lever portion 7 is pushed downward. This pushing down operation allows the support portion 7a of the disengaging lever portion 7 to be lowered and abutted against the horizontal wall 1a of the female housing 1. Even in case where the finger touch portion 17 is further pushed down after the abutment, an elevating moment acting on the latch portion 11a is equal to a pushing down moment of the finger touch portion 17 around the support portion 7a because of a leverage action. Since the radius h of the latch portion 11a around the support portion 7a is set to be larger than the radius g of the pushing down operation side, the elevating force of the latch portion 11a is smaller than the pushing down force of the finger touch portion 17, and thus, there will be no fear that the lock arms 9 may be short of strength.

Figure 4A:
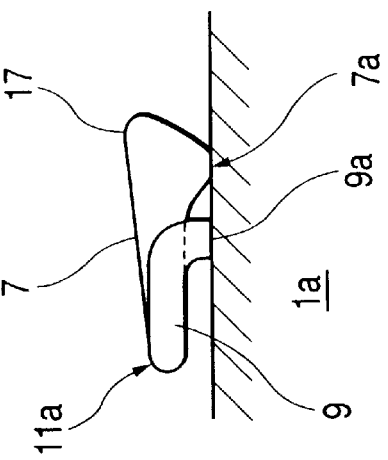
FIGS. 4A–4C are explanatory views showing modified examples in design of a locking structure according to the first embodiment.
Figure 4B:
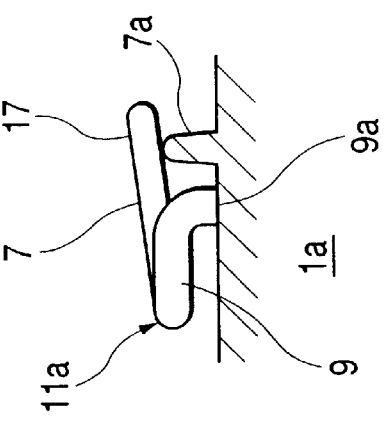
Figure 4C:
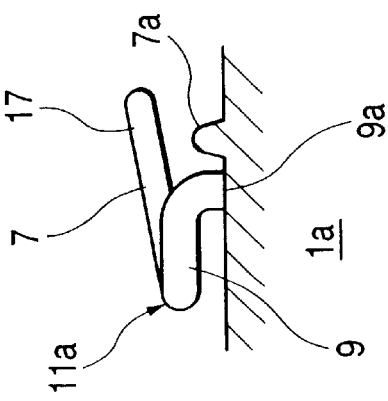

FIGS. 4A, 4B and 4C schematically show modified structures of the support portion 7a which will serve as the pivot of the rotation of the latch portion 11a of the lock arms 9 when the lock is disengaged. The same reference numerals as the above will be employed in the description.

FIGS. 4A and 4B show embodiments in which the support portion 7a is constituted by a projection projected from the horizontal wall 1a of the housing 1. In FIG. 4A, there is a gap between the disengaging lever portion 7 and the support portion 7a during engagement or after disengagement of the lock. FIG. 4B shows a case in which the disengaging lever portion 7 and the support portion 7a are in contact with each other (no gap). FIG. 4C shows a structure in which the disengaging lever portion 7 is provided with the support portion 7a, which is always in contact with the horizontal wall 1a of the housing 1. It is to be noted that the support portion 7a may be provided on both the horizontal wall 1a and the disengaging lever portion 7.

In the structure in which the gap exists between the disengaging lever portion 7 and the support portion 7a, there will be a short period (a time lag) during which the finger touch portion 17 is slightly pushed down without pushing up the latch portion 11a, because the leverage action will not be exerted until the gap is lost, although the finger touch portion 17 is pushed down. In contrast, in the structure in which there is no gap between the disengaging lever portion 7 and the support portion 7a, the leverage action will be exerted at the same time when the finger touch portion 17 is pushed down, thereby pushing the latch portion 11a upward. In this case too, the pivot of the rotation had better be free.

In this manner, also in the structures as shown in FIGS. 4A, 4B and 4C, similar actions and effects to those of the above-described embodiment can be obtained.

According to the embodiment of the invention, as described above, the disengaging lever portion 7 for disengaging the lock between the male and female housings 3 and 1 by means of the leverage action is provided integrally with the latch portion 11a of the lock arms 9 in contrast with the prior art. Therefore, occurrence of an excessive stress on the fixed ends 9a of the lock arms 9 when the latch portion 11a of the lock arms 9 is flexed by a predetermined amount can be prevented, and thus, a risk of breakage of the lock arms 9 will be eliminated.

Other embodiments of the invention will be described hereunder. Constituent elements which are the same as those in the first embodiment will be represented by the same reference numerals, and the overlapped portions will be omitted from the description.

Second Embodiment

Figure 5:
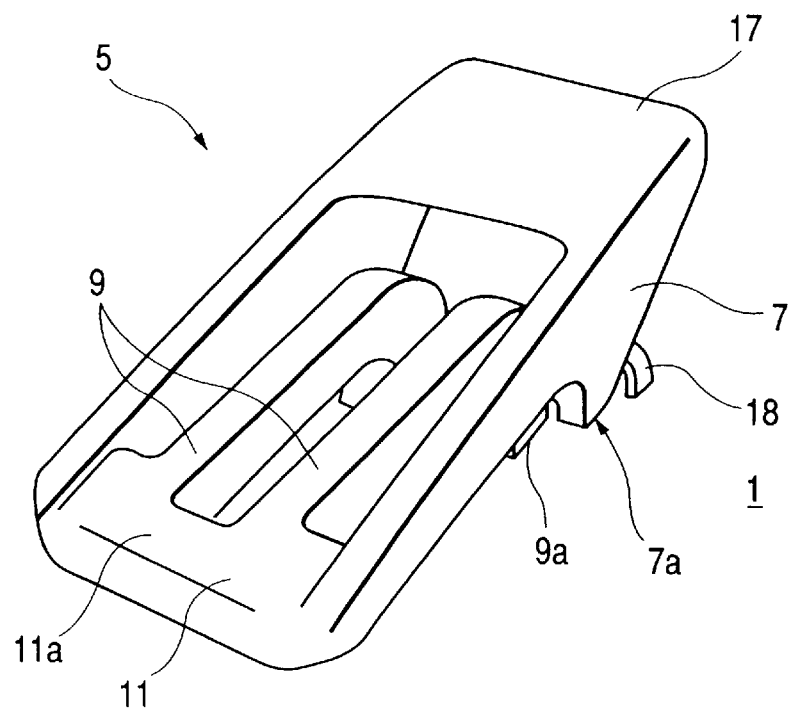
FIG. 5 is a perspective view of a whole lock portion according to the second embodiment.
Figure 6:
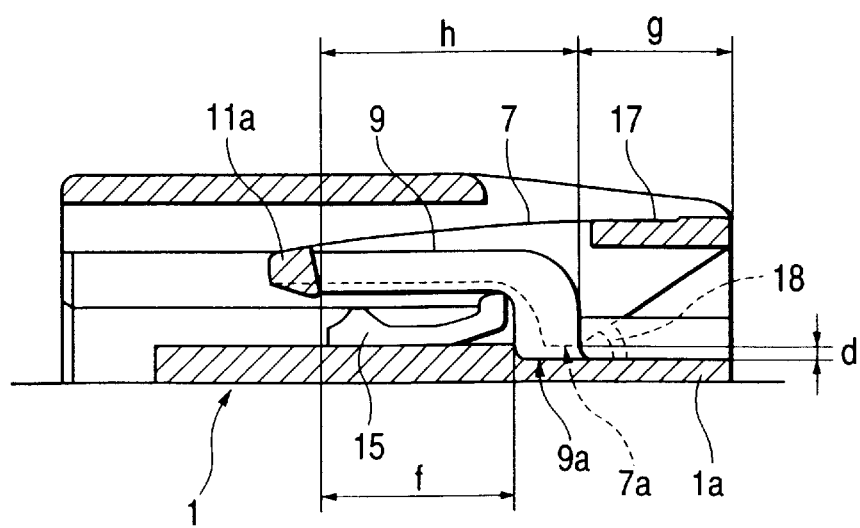
FIG. 6 is a sectional view showing the lock portion of the female connector housing according to the second embodiment.
Figure 7:
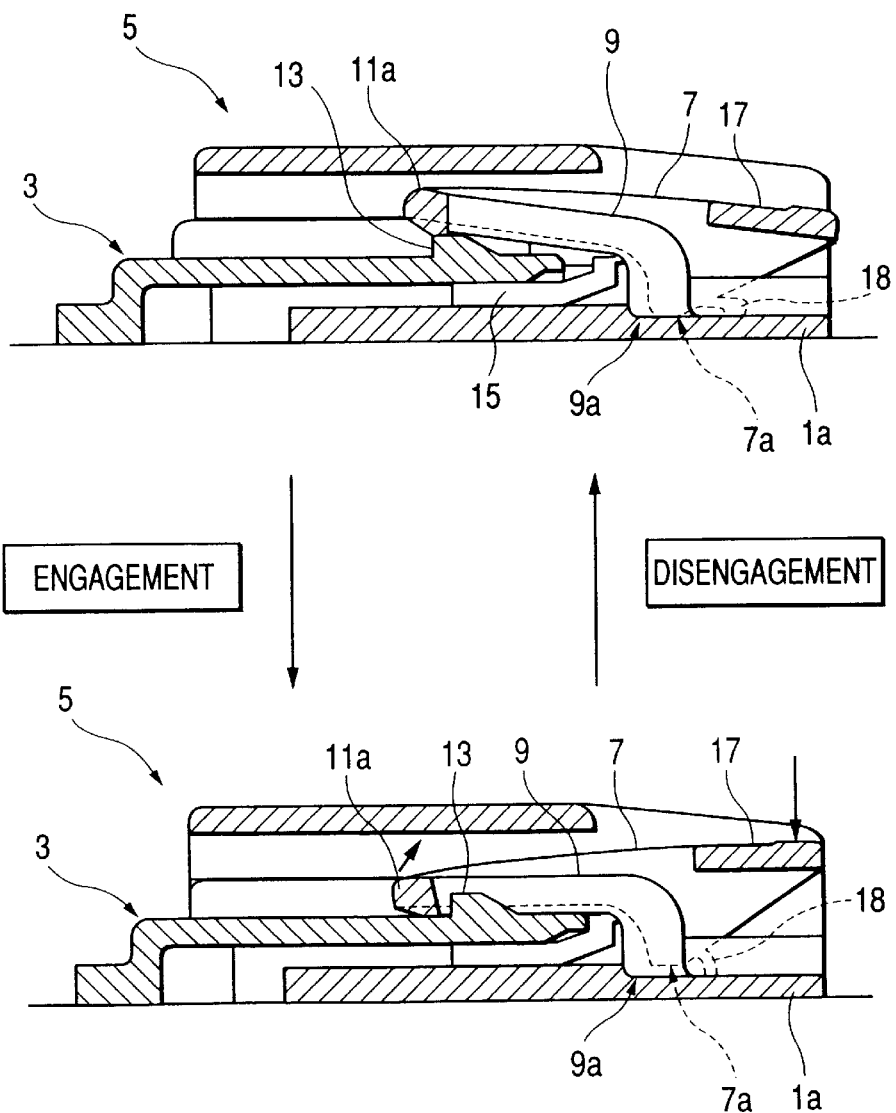
FIG. 7 shows both connector housings according to the second embodiment in operative states, wherein the upper part of FIG. 7 is a sectional view showing a state where the latch portion is not engaged with an engaging portion, and the lower part of FIG. 7 is a sectional view showing a state where the latch portion is engaged with the engaging portion.

Now, the second embodiment as shown in FIGS. 5 to 7 will be described. In this embodiment, the disengaging lever portion 7 in the first embodiment is connected to the connector housing 1 by way of a thin-walled hinge 18 at an opposite side to the latch portion 11a interposing the support portion 7a. This hinge 18 projects from the connector housing 1 to be connected to a back end of the lock arms near the support portion 7a of the disengaging lever portion 7, and molded integrally with the connector housing 1.

As shown in the upper part of FIG. 7, when the engagement between the housings 1 and 3 proceeds and the engaging portion 13 of the male housing 3 is brought in contact with the latch portion 11a of the lock arms 9, the engaging portion 13 pushes the latch portion 11a upward. At this instant, the lock arms 9 are subjected to an upward bending moment around the fixed ends 9a in the back. Then, the lock arms 9 are uniformly flexed along the total length f, and the flexure will not be concentrated on the fixed ends 9a. The working radius of the pushing up force is f. In this state, the hinge 18 is flexed toward the horizontal wall 1a of the connector housing 1.

After the engaging portion 13 has passed over the latch portion 11a, the lock arms 9 which have been in the flexed posture since the latch portion 11a has been pushed up will return to the original posture, allowing the male housing 3 to be locked. The gap d of the support portion 7a will be recovered in the locked state and the hinge will return to the original shape.

Although the posture of the disengaging lever portion 7 changes during transition to the locked state, this change in the posture will be freely performed without interference from other members.

Then, in order to disengage the lock between the housings 1 and 3 from the state as shown in the lower part of FIG. 7, the finger touch portion 17 in the back end of the disengaging lever portion 7 is pushed downward. This pushing down operation allows the support portion 7a of the disengaging lever portion 7 to be lowered and abutted against the horizontal wall 1a of the female housing 1. Even in case where the finger touch portion 17 is further pushed down after the abutment, an elevating moment acting on the latch portion 11a will be equal to a pushing down moment of the finger touch portion 17 around the support portion 7a because of the leverage action. Since the radius h of the latch portion 11a around the support portion 7a is set to be larger than the radius g of the pushing down operation side, the elevating force of the latch portion 11a is smaller than the pushing down force of the finger touch portion 17, and thus, there will be no fear that the lock arms 9 may be short of strength.

According to this embodiment, similar effects to those of the above described first embodiment can be obtained, and in addition, because the disengaging lever portion 7 is connected to the connector housing 1 by means of the hinge 18, any breakage of the locking members due to deformation of the disengaging lever portion 7 after molding can be prevented.

Moreover, dimensional stability with respect to a position of the disengaging lever portion 7 and a position of the support portion 7a at molding will be enhanced.

Further, occurrence of inconveniences in a packed state, such as entanglements between the housings can be prevented, and deformation of the lock arms 9 caused by the entanglements between the housings can be prevented.

Third Embodiment

Figure 8:
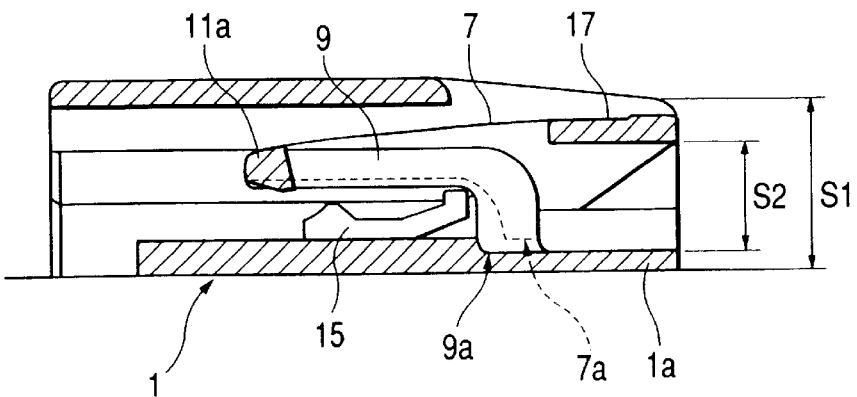
FIG. 8 is a sectional view showing a female connector housing according to the third embodiment.
Figure 9:
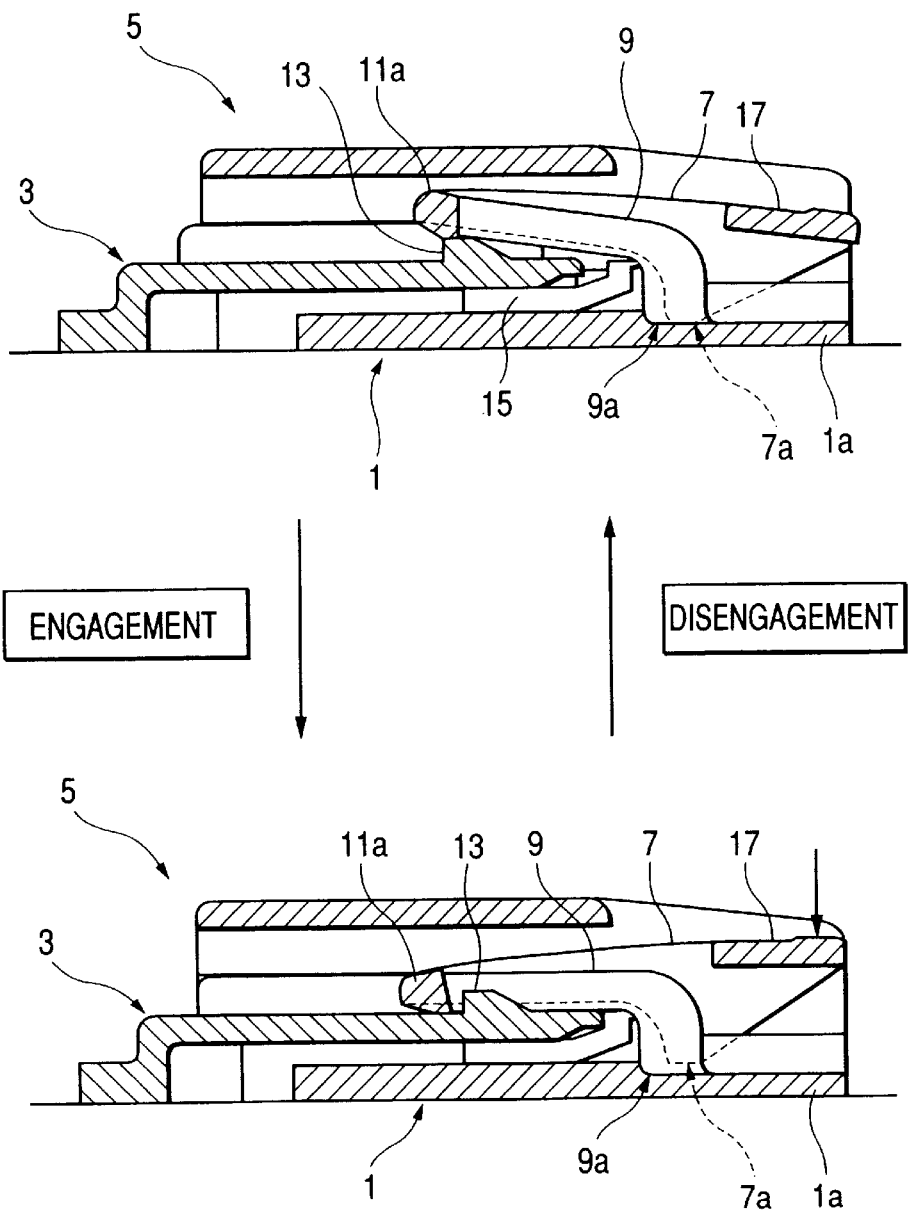
FIG. 9 shows both connector housings according to the third embodiment in operative states, wherein the upper part of FIG. 9 is a sectional view showing a state where the latch portion is not engaged with an engaging portion, and the lower part of FIG. 9 is a sectional view showing a state where the latch portion is engaged with the engaging portion.

Now, the third embodiment as shown in FIGS. 8 and 9 will be described. This embodiment is an example in which the support portion 7a is preliminarily in contact with the horizontal wall 1a of the housing 1. In other words, in the above-described first and second embodiments, the gap is formed between the support portion 7a and the horizontal wall 1a of the housing 1 in the in the initial state, namely before the housings 1 and 3 are engaged, in this embodiment, there is no gap between the support portion 7a and the horizontal wall 1a, that is, they are in contact with each other from the beginning.

For molding the housing 1, a gap is inevitably created between the support portion 7a and the horizontal wall 1a due to an extracting direction of metal molds. However, the support portion 7a and the horizontal wall 1a can be kept in contact with each other, by applying a load or so after molding.

In a similar manner to the above-described first and second embodiments, by engaging the housings 1 and 3 with each other, the latch portion 11a is locked with the engaging portion 13 to be brought into a locked condition. Then, by pushing the finger touch portion 17 downward, the locked condition can be disengaged.

According to this embodiment, similar effects to those of the above-described first embodiment can be obtained, and in addition, because the support portion 7a is in contact with the horizontal wall 1a leaving no gap in the initial state, a height S1 from the horizontal wall 1a to the finger touch portion 17 can be decreased. As the result, a large space can be secured above the finger touch portion 17 during the disengaging operation from the locked condition, and the lock disengaging operation can be smoothly conducted even in a limited space.

Further, because a space S2 between the finger touch portion 17 and the horizontal wall 1a is narrow, deformation of the lock arms due to an intrusion of a wire harness or the like can be prevented.

Fourth Embodiment

Now, the fourth embodiment as shown in FIGS. 10 to 14 will be described. This embodiment is an example in which excessive displacements of the disengaging lever portion 7 in the locking direction and the lock disengaging direction are prevented.

Figure 10:
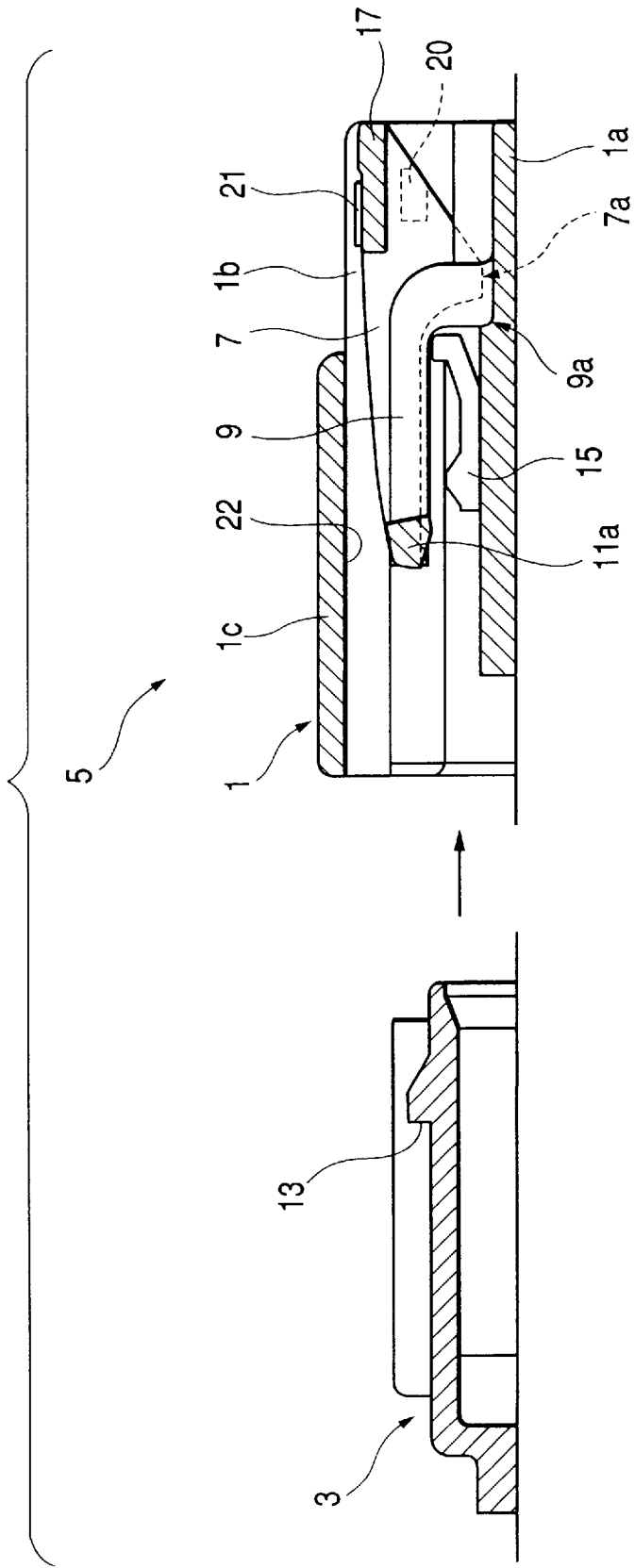
FIG. 10 is a sectional view showing both connector housings according to the fourth embodiment.
Figure 11:
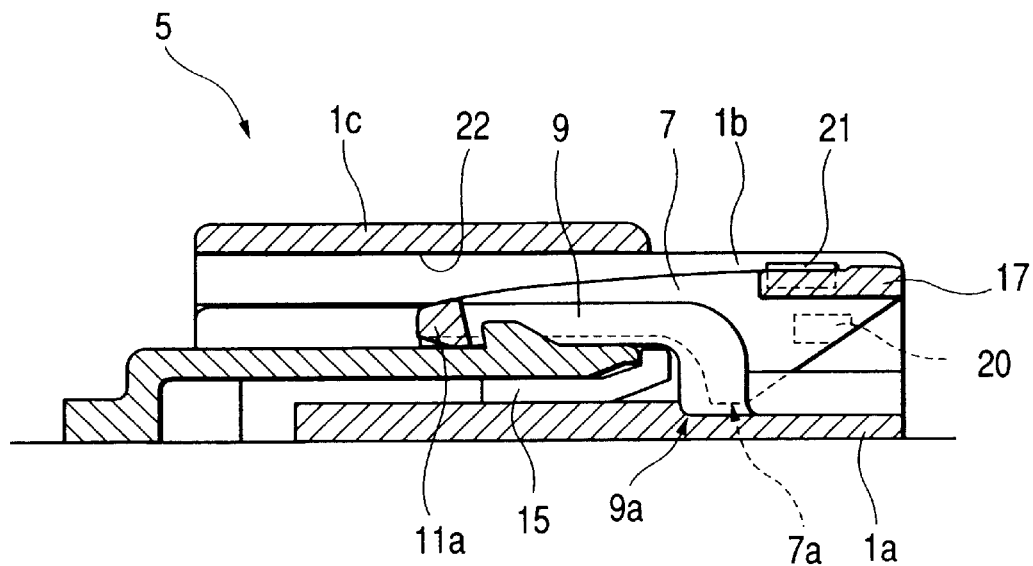
FIG. 11 is a sectional view showing both the connector housings according to the fourth embodiment in the locked state.
Figure 12:
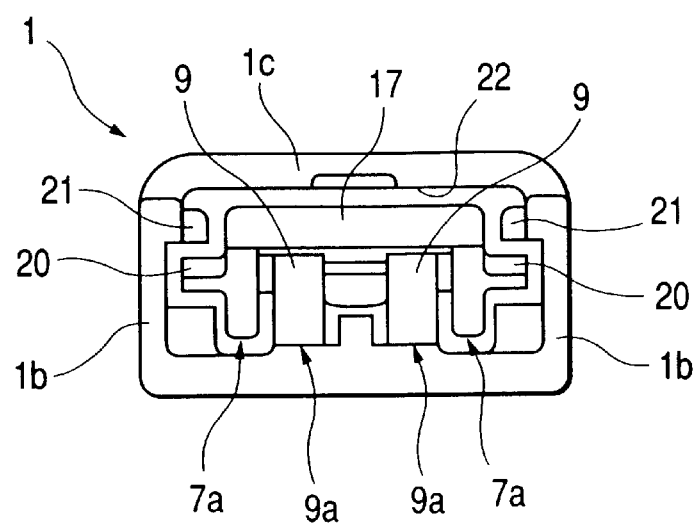
FIG. 12 is a front view of the female connector housing according to the fourth embodiment as seen from a backward end.

As shown in FIGS. 10 to 12, lever side excessive displacement preventing pieces 20, 20 (See FIG. 13) are provided on both sides of the finger touch portion 17 in a projecting manner. Moreover, the female connector housing 1 is provided with housing side excessive displacement preventing pieces 21, 21 (See FIG. 13) opposed to these lever side excessive displacement preventing pieces 20, 20 on both vertical walls 1b, 1b.

Figure 13:
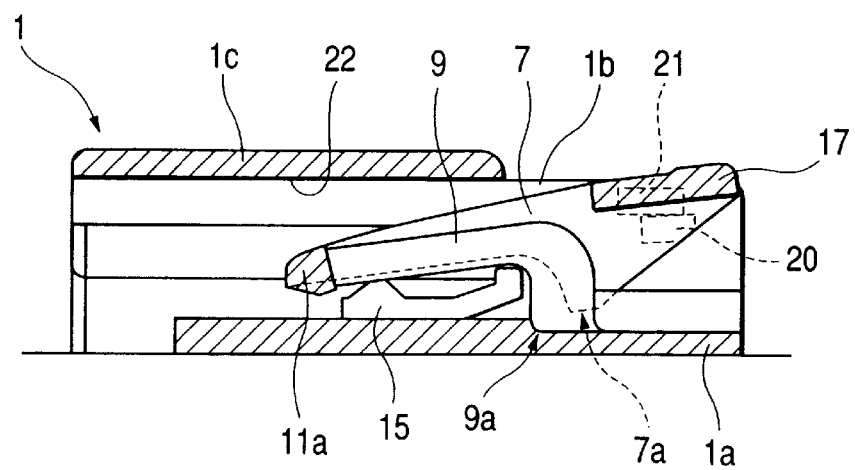
FIG. 13 is a sectional view of the female connector housing according to the fourth embodiment in a state where lever side excessive displacement preventing pieces are abutted against housing side excessive displacement preventing pieces.

As shown in FIG. 13, when an external force in a direction in which the latch portion 11a is locked with the engaging portion 13 of the mating connector housing 3 (locking direction) is inadvertently applied to the finger touch portion 17, the lever side excessive displacement preventing pieces 20, 20 are respectively abutted against the housing side excessive displacement preventing pieces 21, 21. This prevents the excessive displacements of the lock arms 9 and the disengaging lever portion 7, and accordingly, breakage of the lock portion 5 will be avoided.

Further, the female connector housing 1 has an outer wall 1c which covers from the lock arms 9 to the latch portion 11a. An excessive displacement preventing wall portion 22 is provided inside this outer wall 1c.

Figure 14:
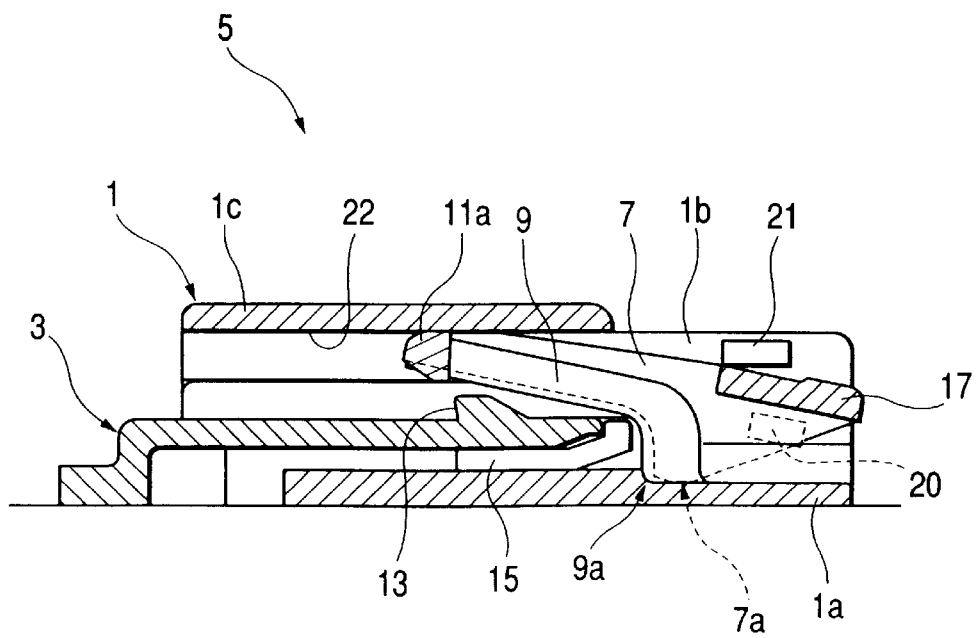
FIG. 14 is a sectional view of the female connector housing according to the fourth embodiment in a state where a latch portion is abutted against an excessive displacement preventing wall portion.
Figure 15A:
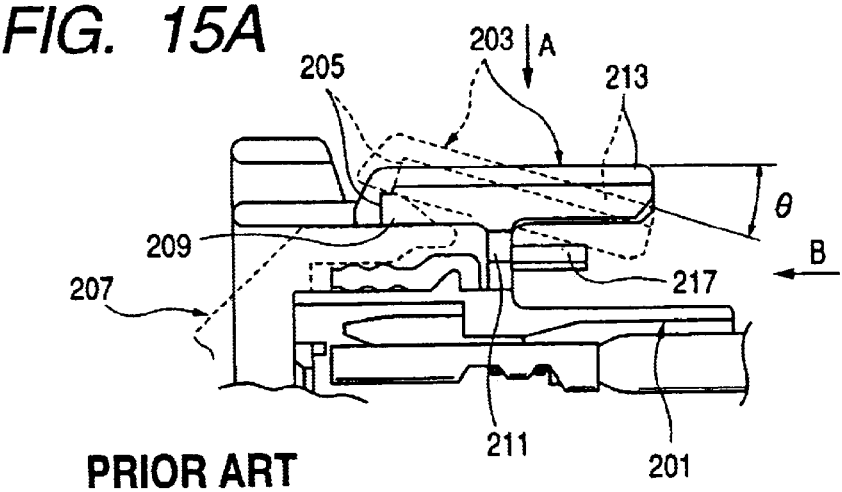
FIG. 15A is a sectional view showing a lock portion of a conventional locking structure.
Figure 15B:
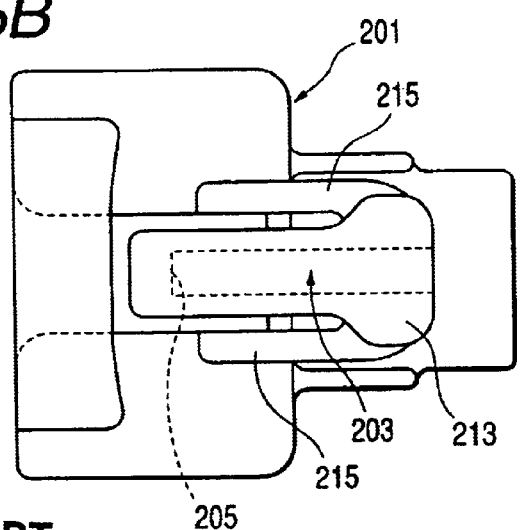
FIG. 15B is a view as seen in a direction of an arrow A of FIG. 15A.
Figure 15C:
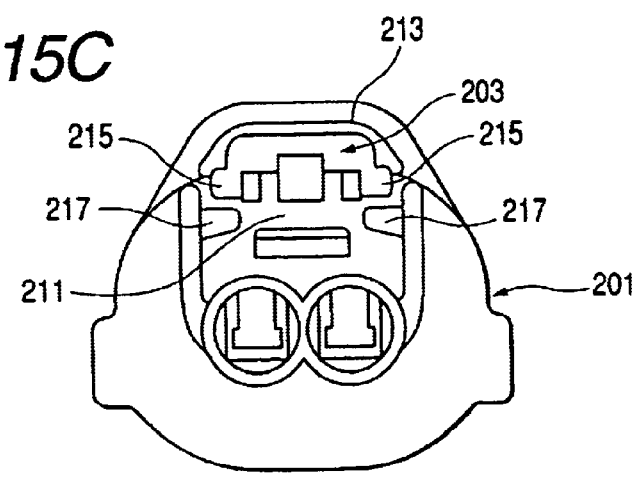
FIG. 15C is a view as seen in a direction of an arrow B of FIG. 15A.

As shown in FIG. 14, when an external force in a direction in which the latch portion 11a is disengaged from the engaging portion 13 of the mating connector housing 3 (lock disengaging direction) is inadvertently applied to the finger touch portion 17, the latch portion 11a is abutted against the excessive displacement preventing wall portion 22. This will prevent excessive displacements of the lock arms 9 and the disengaging lever portion 7, and accordingly, breakage of the lock portion 5 will be prevented.

It is to be noted that only the lever side excessive displacement preventing pieces 20, 20 and the housing side excessive displacement preventing pieces 21, 21 may be provided on the female connector housing 1 so that the excessive displacements of the disengaging lever portion 7 and the lock arms 9 only in the locking direction may be prevented.

The above-described fourth embodiment may be combined with the aforesaid second and third embodiments. In such cases, occurrence of the excessive stress on the fixed ends 9a of the lock arms 9 can be eliminated, and at the same time, the excessive displacements of the disengaging lever portion 7 and the lock arms 9 can be prevented, thus enabling a less breakable lock portion 5 to be formed.

As apparent from the foregoing description, according to the invention as described in claim 1, the member resisting to the displacement of the latch portion when both the housings are engaged is only the arms in a cantilever type, and by appropriately setting the length and thickness of the arms, for example, the arms are uniformly flexed along their full length. Since the stress will not be concentrated on the base end portions of the arms, the flexural angle at the fixed ends of the arms is thus limited to be small, and the arms will become less breakable.

When the lock is disengaged, the latch portion rotates around the pivot together with the disengaging lever portion, whereby the locked condition will be disengaged. On this occasion, because the pivot of the rotation can be displaced, the latch portion can rotate without resistance, and the arms which have been in the flexed state will not be subjected to an undue load. Therefore, the problem of shortage of strength will not happen.

According to the invention as described in claim 2, similar actions and effects to those of the invention of claim 1 can be obtained, and at the same time, flexibility of designing the support portion will be increased.

According to the invention as described in claim 3, similar actions and effects to those of the invention of claim 1 or 2 can be obtained, and at the same time, because the length of the arms is substantially equal to the radius of the rotation of the latch portion, strength of the fixed ends of the arms can be easily set.

According to the invention as described in claim 4, similar actions and effects to those of the invention of any one of claims 1 to 3 can be obtained, and at the same time, operating force and operating stroke of the disengaging operation section required for disengagement of the lock can be appropriately and easily set.

According to the invention as described in claim 5, similar actions and effects to those of the invention of any one of claims 1 to 4 can be obtained, and at the same time, when the connector housing is molded, dimensional stability with respect to the position of the disengaging lever portion and the position of the support portion will be enhanced.

According to the invention as described in claim 6, in addition to the actions and effects of the inventions of claims 1 to 5, when an external force in the locking direction is inadvertently applied to the disengaging lever portion, the lever side excessive displacement preventing pieces are abutted against the housing side excessive displacement preventing pieces, whereby the excessive displacement of the disengaging lever portion in the locking direction will be prevented.

According to the invention as described in claim 7, in addition to the actions and effects of the invention of claim 6, when an external force in the lock disengaging direction is inadvertently applied to the disengaging lever portion, the latch portion is abutted against the excessive displacement preventing wall portion, whereby the excessive displacement of the disengaging lever portion in the lock disengaging direction will be prevented.

What is claimed is:

1. A locking structure for a connector comprising:
    a first connector housing having a flexible arm fixed on a wall of said first connector housing at one end of the arm and providing a latch portion on the other end of the arm, and a disengaging lever portion connected at one end thereof to said latch portion so as to extend along said arm; and
    a second connector housing having an engaging portion adapted to engage with said latch portion of said first connector housing and to disengageably lock said first connector housing and said second connector housing;
    wherein said disengaging lever portion rotates with said latch portion around a pivot which is movable when the lock is disengaged, wherein said disengaging lever portion is connected to said first connector housing by means of a hinge, wherein said hinge is disposed at an opposite side of said first connector housing to said latch portion, thereby interposing said pivot between said latch and said hinge.

2. A locking structure for a connector according to claim 1, wherein at least one of said disengaging lever portion and said wall of said first connector housing has a support portion which serves as said pivot of the rotation of said latch portion.

3. A locking structure for a connector according to claim 1, wherein said pivot of the rotation is provided at a substantially same position as said one end of said flexible arm.

4. A locking structure for a connector according to claim 1, wherein said disengaging lever portion comprises a lock disengaging operation section at an opposite side to said latch portion interposing said pivot, and a distance between said pivot and said latch portion is set to be larger than a distance between said pivot and said lock disengaging operation section.

5. A locking structure for a connector according to claim 1, wherein said locking structure further comprises lever side excessive displacement preventing pieces provided on both sides of a finger touch portion positioned at an opposite side to said latch portion, and housing side excessive displacement preventing pieces provided on one of said first and second connector housings, and
    wherein said lever side excessive displacement preventing pieces are adapted to be abutted to said housing side excessive displacement preventing pieces to thereby prevent an excessive displacement of said disengaging lever portion in a locking direction.

6. A locking structure for a connector according to claim 5, wherein an outer wall of one of said first and second connector housings covers upper parts of said arm up to said latch portion, and an inner face of said outer wall serves as an excessive displacement preventing wall portion whereby said latch portion is adapted to be abutted to prevent an excessive displacement of said disengaging lever portion in a lock disengaging direction.

7. A locking structure for a connector comprising:
    a first connector housing having a flexible arm fixed on a wall of said first connector housing at one end of the arm and providing a latch portion on the other end of the arm, and a disengaging lever portion connected at one end thereof to said latch portion so as to extend along said arm; and a second connector housing having an engaging portion adapted to engage with said latch portion of said first connector housing and to disengageably lock said first connector housing and said second connector housing;

wherein said disengaging lever portion rotates with said latch portion around a pivot which is movable when the lock is disengaged, wherein said disengaging lever portion includes a support portion which serves as a pivot of rotation for the disengaging lever portion and which directly contacts the wall of the first connector housing and wherein a gap is provided between the support portion and the wall when the disengaging lever portion is in an undeflected state.

* * * * *